United States Patent
Schellenberger et al.

(10) Patent No.: US 12,465,659 B2
(45) Date of Patent: Nov. 11, 2025

(54) IRON(III) COMPLEXES HAVING NEW CONTRAST AGENT PROPERTIES, FOR MAGNETIC RESONANCE IMAGING

(71) Applicant: CHARITÉ—UNIVERSITÄTSMEDIZIN BERLIN, Berlin (DE)

(72) Inventors: Eyk Schellenberger, Berlin (DE); Ralf Hauptmann, Berlin (DE); Akvile Häckel, Lutherstadt Wittenberg (DE); Jing Xie, Berlin (DE); Jörg Schnorr, Oranienburg (DE); Bernd Hamm, Berlin (DE)

(73) Assignee: CHARITÉ—UNIVERSITÄTSMEDIZIN BERLIN, Berlin (DE)

( * ) Notice: Subject to any disclaimer, the term of this patent is extended or adjusted under 35 U.S.C. 154(b) by 903 days.

(21) Appl. No.: 17/642,668

(22) PCT Filed: Oct. 16, 2020

(86) PCT No.: PCT/EP2020/079182
§ 371 (c)(1),
(2) Date: Mar. 11, 2022

(87) PCT Pub. No.: WO2021/074368
PCT Pub. Date: Apr. 22, 2021

(65) Prior Publication Data
US 2022/0331454 A1    Oct. 20, 2022

(30) Foreign Application Priority Data
Oct. 18, 2019   (EP) ..................... 19203859

(51) Int. Cl.
*A61K 49/10*   (2006.01)
*C07C 229/16*   (2006.01)

(52) U.S. Cl.
CPC .......... *A61K 49/106* (2013.01); *C07C 229/16* (2013.01)

(58) Field of Classification Search
CPC .... A61K 49/00; A61K 49/106; A61K 49/103; C07C 229/16; C07C 229/10
See application file for complete search history.

(56) References Cited
U.S. PATENT DOCUMENTS

| | | | |
|---|---|---|---|
| 5,021,571 A | 6/1991 | Mease et al. | |
| 5,089,663 A * | 2/1992 | Mease .................. | C07D 265/32 562/507 |
| 11,771,780 B2 * | 10/2023 | Schellenberger .... | A61K 49/106 424/9.3 |

OTHER PUBLICATIONS

International Search Report of PCT/EP2020/079182, Jan. 19, 2021, 7 pages.
Mease, "Indium-111 CDTA-(aminostyryl)pyridinium (ASP) dyes as new radioactive cell membrane permeant probes: Synthesis, leukocyte labeling, and serum stability", Journal of Labelled Compounds and Radiopharmaceuticals, vol. 42, No. sUPPL. 1, Jan. 1, 1999, p. s815-s817, Retrieved from the Internet: URL:https://pomper.sairp.rad.jhmi.edu/People/RonnieMease.html.
Wang et al, "Molecular Magnetic Resonance Imaging Using a Redox-Active Iron Complex", Journal of the American Chemical Society, vol. 141, No. 14, Mar. 15, 2019, p. 5916-5925.
Boehm-Sturm et al, "Low-Molecular-Weight Iron Chelates May Be an Alternative to Gadolinium-based Contrast Agents for T1-weighted Contrast-enhanced MR Imaging", Radiology, vol. 286, No. 2, Feb. 1, 2018, pp. 537-546.
Brandt et al., "52g/55 Mn-Labelled CDTA-based trimeric complexes as novel bimodal PET/MR probes with high relaxivity", Dalton Transactions, vol. 48, No. 9, Feb. 6, 2019, pp. 3003-3008.

* cited by examiner

*Primary Examiner* — D. L. Jones
(74) *Attorney, Agent, or Firm* — Lewis Roca Rothgerber Christie LLP

(57) ABSTRACT

The invention provides novel iron(III) complexes with formulae (1) and (2). Furthermore, corresponding ligands with formulae (L1) and (L2) for the production of iron(III) complexes are disclosed.

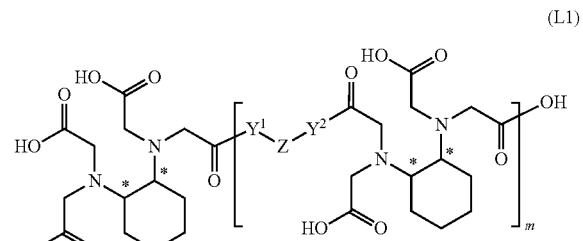

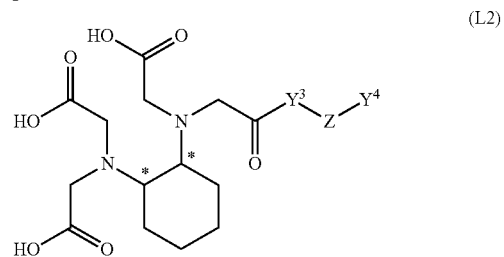

15 Claims, 1 Drawing Sheet

IRON(III) COMPLEXES HAVING NEW CONTRAST AGENT PROPERTIES, FOR MAGNETIC RESONANCE IMAGING

CROSS-REFERENCE TO RELATED APPLICATION(S)

This application is a U.S. National Phase Patent Application of International Application Number PCT/EP2020/079182, filed on Oct. 16, 2020, which claims priority to European Patent Application Number 19203859.4, filed Oct. 18, 2019, the entire content of each of which is incorporated herein by reference.

The invention relates to novel iron(III) complexes, which in particular are suitable as contrast agents for magnetic resonance imaging. Furthermore, ligands for the production of these iron(III) complexes are disclosed.

TECHNICAL BACKGROUND

Low molecular weight gadolinium-based contrast agents (GBCA) have become the standard in improving the validity of magnetic resonance imaging (MRI) examinations in all fields of medicine. In 2015 in Germany, over 10.8 million magnetic resonance imaging (MRI) examinations were carried out (de.statista.com). In approximately one third of these MRI examinations, GBCA was administered intravenously for T1-weighted imaging, whereupon improved diagnoses could be made in cases of acute and chronic inflammation, tumours, vascularisation etc. In this regard, GBCA accelerates both the T1 relaxation (spin-lattice relaxation) as well as the T2 relaxation (spin-spin relaxation), wherein the T1 relaxation results in a diagnostically useful MRI signal increase in corresponding T1-weighted imaging.

Free gadolinium ions are toxic (for example, dos Remedios C G, "Lanthanide ion probes of calcium-binding sites on cellular membranes", Cell Calcium, 1981; 2(1):29-51 and Bower D V et al., "Gadolinium-Based MRI Contrast Agents Induce Mitochondrial Toxicity and Cell Death in Human Neurons, and Toxicity Increases With Reduced Kinetic Stability of the Agent", Investigative Radiology, 2019; 54(8):453-463). Because their chemical behaviour is similar to that of calcium ions, they can, for example, be incorporated into the liver and the bone system and remain there for years. Because the ionic radii of calcium and gadolinium are similar, gadolinium can act as a calcium antagonist and, for example, inhibit myocardial contractility and the coagulation system (Darrah T H et al., "Incorporation of excess gadolinium into human bone from medical contrast agents", Metallomics, 2009; 1(6):479-488). Although gadolinium ions are toxic. GBCAs were licensed on the condition that in the authorized pharmaceuticals, they were securely fixed in complexing agents, for example DTPA (diethylenetriamine pentaacetic acid) and DOTA (1,4,7,10-tetraazacyclododecane-1,4,7,10-tetraacetic acid), and that they are very rapidly and completely excreted with them, primarily via the kidneys.

It has been shown, however, that excretion is not complete under some circumstances. Thus, approximately 12 years ago, what is known as nephrogenic systemic fibrosis was recognised as a severe side effect of incompletely excreted gadolinium contrast agents which had been administered to patients with a compromised kidney function (Grobner T., "Gadolinium—a specific trigger for the development of nephrogenic fibrosing dermopathy and nephrogenic systemic fibrosis?", Nephrol Dial Transplant. 2006; 21(4):1104-1108 and Idée J M et al., "The role of gadolinium chelates in the mechanism of nephrogenic systemic fibrosis: A critical update", Crit Rev Toxical. 2014; 44(10):895-913). A different animal experimental study showed that following the administration of GBCA, gadolinium could still be detected in skin biopsies from rats after one year (Pietsch H et al., "Long-term retention of gadolinium in the skin of rodents following the administration of gadolinium-based contrast agents", Eur Radical 2009; 44(4):226-233). The extent of gadolinium accumulation was shown to be dependent on the type of complexing agent, in particular the stability of the gadolinium complexes.

Particularly in the case of repeated administration of low molecular weight contrast agents, as is necessary, for example, in breast tumour screening or in monitoring the progress of multiple sclerosis, deposits have been found in the brain tissue of healthy people (see, for example, McDonald R J et al., "Intracranial Gadolinium Deposition after Contrast-enhanced MR Imaging", Radiology 2015; 275(3): 772-782). ICP-MS was also used to show that gadolinium deposits of more stable macrocyclic GBCA were also found in samples from deceased patients, in particular in the bones and in the brain (Murata N et al., "Macrocyclic and Other Non-Group 1 Gadolinium Contrast Agents Deposit Low Levels of Gadolinium in Brain and Bone Tissue: Preliminary Results From 9 Patients With Normal Renal Function", Invest Radial 2016; 51(7):447-453).

In the past, it has been shown that low molecular weight iron complexes (in particular Fe-DTPA, Fe-tCDTA (tCDTA=trans-cyclohexanediamine tetraacetic acid) can be used as contrast agents for MRI. Although the relaxivities of these iron complexes are lower compared with GBCA, higher doses can overcome this disadvantage (see, for example, White D L et al., "IRON(III) COMPLEXES AS MRI CONTRAST AGENTS", Proc. Int. Soc. Magn. Reson. Med. 1985; 1985(S2):906-909). Because of the large quantity of endogenous iron (approximately 4 g for an adult) and the systems available for its absorption, storage and transport, it can be assumed that the long term toxicity for iron complexes should be smaller than for GBCA. Furthermore, iron oxide nanoparticles (which can be used as contrast agents or for iron replacement therapy) are generally well tolerated although, in contrast to the almost completely excreted low molecular weight contrast agents, they remain in the body almost in their entirety following intravenous administration.

It has already been shown that iron complexes are also suitable for typical current applications such as, for example, dynamic contrast-enhanced MRI (DCE-MRI), which is used, for example, in breast tumour diagnostics (Boehm-Sturm P et al., "Low-Molecular-Weight Iron Chelates May Be an Alternative to Gadolinium-based Contrast Agents for T1-weighted Contrast-enhanced MR Imaging", Radiology 2017; 286(2):537-546).

U.S. Pat. No. 5,362,475 A describes, inter alia, the production of iron-based contrast agents, specifically the sodium or N-methylglucamine salt of an iron(III) complex with tCDTA ligand.

Gestin et al. (Nucl. Med. Biol., 1993; 20(6) 755-762) describes, inter glia, the synthesis of N-[methyl(2-aminoethyl)carbamide]-trans-1,2-diaminocyclohexane-N,N',N'-triacetic acid as an intermediate for novel bifunctional chelating agents for indium-labelled antibodies.

Philipp Boehm-Sturm et al., "Low-Molecular-Weight Iron Chelates May Be An Alternative to Gadolinium-based Contrast Agents for T1-weighted Contrast-enhanced MR Imaging", RADIOLOGY, Vol. 286, No. 2, February 2018, pages 537-546, discloses a Fe-DTPA complex and its use as contrast agents for magnetic resonance imaging.

Mane R. Brandt et al., "$^{52g/55}$Mn-Labelled CDTA-based trimeric complexes as novel bimodal PET/MR probes with high relaxivity", Dalton Trans., 2019, Vol. 48, pages 3003-3008, describe Mn-CDTA complexes which could possibly be used as a contrast agent in magnetic resonance imaging.

There is therefore still a need for alternative, gadolinium-free contrast agents. Furthermore, it would be desirable for contrast agents to exhibit, for example, a pH-dependent resonance behaviour so that new diagnostic possibilities arise.

SUMMARY OF THE INVENTION

The invention provides novel iron(III) complexes with formulae (1) and (2) in accordance with claim 1:

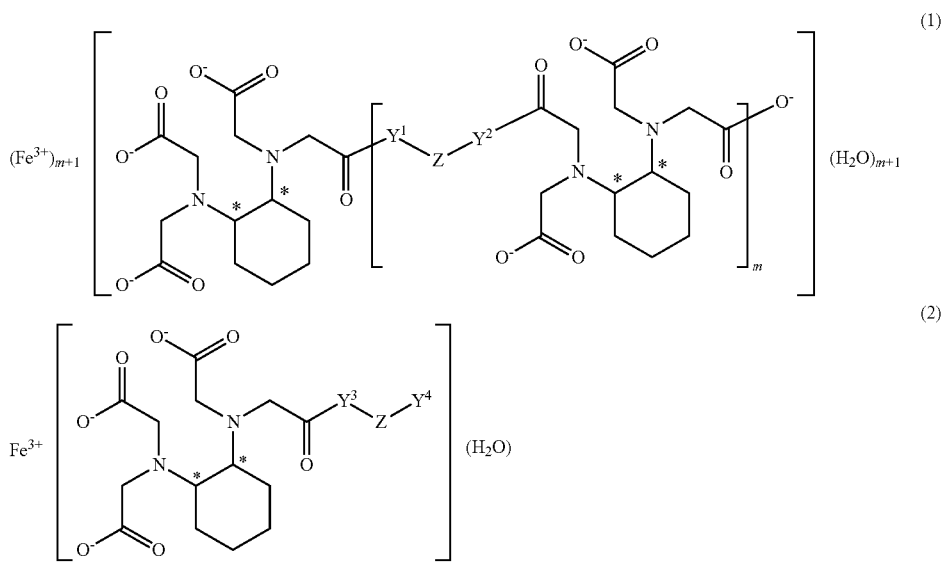

in which m=1 to 5;

$Y^1$ and $Y^2$, independently of one another, are selected from the group comprising O, NH and NR, wherein R represents C1-C15 alkyl or C3-C10 cycloalkyl;

$Y^3$ is selected from the group comprising O, NH and NR, wherein R represents C1-C15 alkyl or C3-C10 cycloalkyl;

$Y^4$ is selected from the group comprising OH, OR, $NH_2$, NHR and $NR^5R^6$, wherein R, R5 and R6 represent C1-C15 alkyl or C3-C10 cycloalkyl and $R^5$ and $R^6$ are selected independently of each other;

Z represents a bridge in accordance with one of formulae (3) to (10):

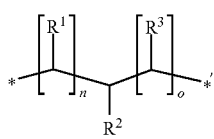
(3)

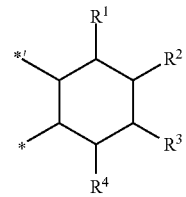
(4)

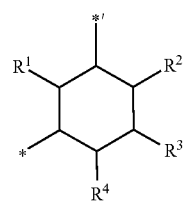
(5)

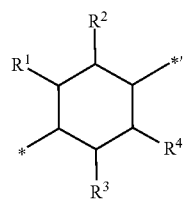
(6)

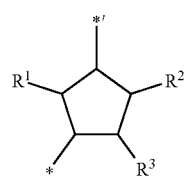
(7)

-continued

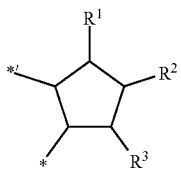 (8)

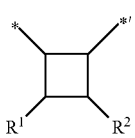 (9)

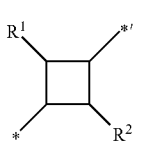 (10)

in which
n=0 to 4;
o=0 to 4;
and *' represents the binding sites for the bridge Z to $Y^1$ and $Y^2$ of formula (1) or $Y^3$ and $Y^4$ of formula (2); and
$R^1$, $R^2$, $R^3$ and $R^4$, independently of one another, are selected from the group comprising H, C1-C15 alkyl and C3-C10 cycloalkyl.

In further aspects, the invention pertains to the use of iron(III) complexes with formulae (1) or (2) in in-vivo diagnostic processes, in particular as contrast agents for magnetic resonance imaging, as well as in the preparation of a contrast agent for magnetic resonance imaging which contains said iron(III) complexes.

Furthermore, the invention provides novel ligands with formulae (L1) or (L2) as an intermediate product which can be converted with iron(III) into the complexes described above:

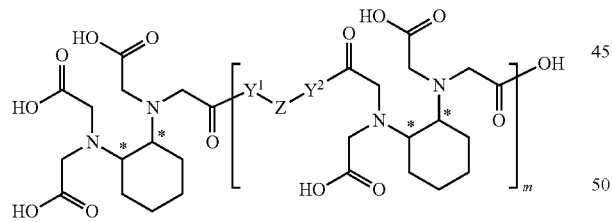 (L1)

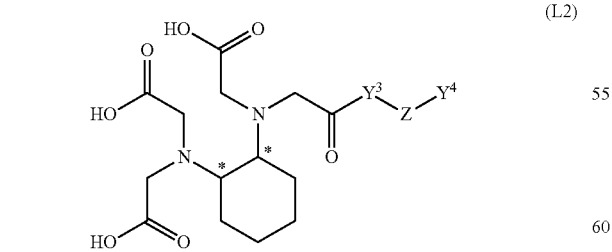 (L2)

in which
m=1 to 5;
$Y^1$ and $Y^2$, independently of one another, are selected from the group comprising O, NH and NR, wherein R represents C1-C15 alkyl or C3-C10 cycloalkyl;

$Y^3$ is selected from the group comprising O, NH and NR, wherein R represents C1-C15 alkyl or C3-C10 cycloalkyl;

$Y^4$ is selected from the group comprising OH, OR, $NH_2$, NHR and $NR^5R^6$, wherein R, $R^5$ and $R^6$ represent C1-C15 alkyl or C3-C10 cycloalkyl and $R^5$ and $R^6$ are selected independently of each other;

Z represents a bridge in accordance with one of formulae (3) to (10):

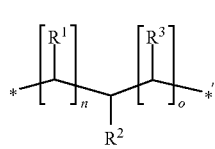 (3)

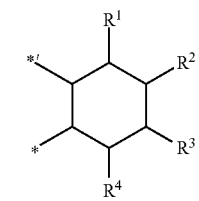 (4)

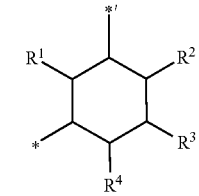 (5)

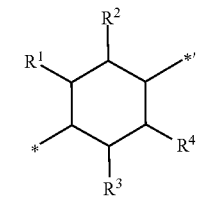 (6)

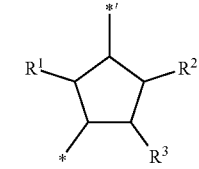 (7)

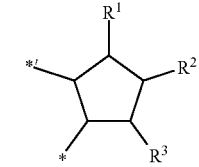 (8)

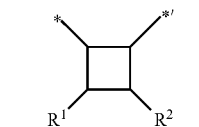 (9)

-continued

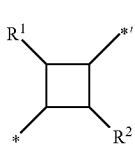
(10)

in which
n=0 to 4;
o=0 to 4;
* and *' represent binding sites for the bridge Z to $Y^1$ and $Y^2$ of formula (1) or $Y^3$ and $Y^4$ of formula (2); and
$R^1$, $R^2$, $R^3$ and $R^4$, independently of one another, are selected from the group comprising H, C1-C15 alkyl and C3-C10 cycloalkyl;
with the exception of ligands with formula (L2) in which Z is equal to *—$CH_2CH_2$—*'.

Further preferred embodiments of the invention are provided in the description below.

BRIEF DESCRIPTION OF THE FIGURES

The invention will now be described with the aid of exemplary embodiments and an accompanying drawing. In the single FIGURE.

DETAILED DESCRIPTION OF THE INVENTION

Figure 1A:
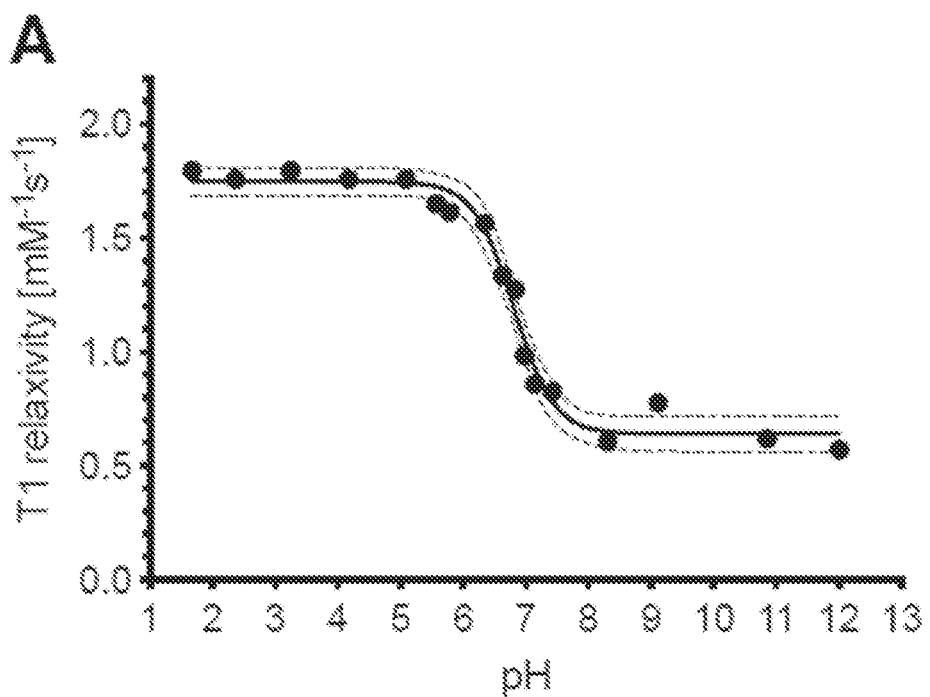
FIG. 1 shows the dependency of the T1- and T2-relaxivity of the iron(III) complex (2-1) on pH.

The invention provides novel iron(III) complexes with formulae (1) and (2) in accordance with claim 1:

in which
m=1 to 5;
$Y^1$ and $Y^2$, independently of one another, are selected from the group comprising O, NH and NR, wherein R represents C1-C15 alkyl or C3-C10 cycloalkyl;
$Y^3$ is selected from the group comprising O, NH and NR, wherein R represents C1-C15 alkyl or C3-C10 cycloalkyl;
$Y^4$ is selected from the group comprising OH, OR, $NH_2$, NHR and $NR^5R^6$, wherein R, $R^5$ and $R^6$ represent C1-C15 alkyl or C3-C10 cycloalkyl and $R^5$ and $R^6$ are selected independently of each other;
Z represents a bridge in accordance with one of formulae (3) to (10):

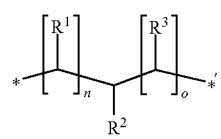
(3)

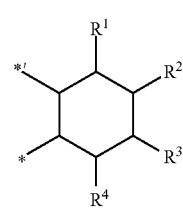
(4)

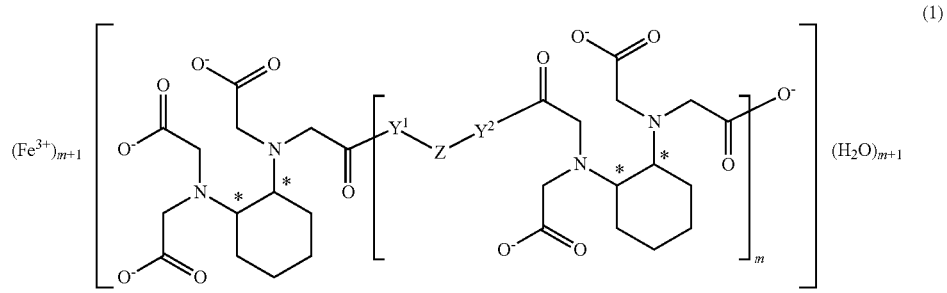
(1)

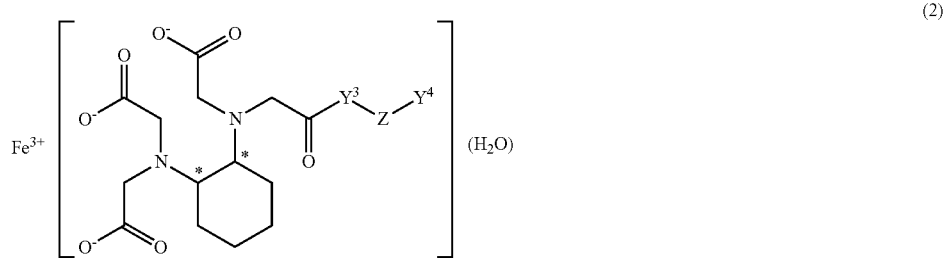
(2)

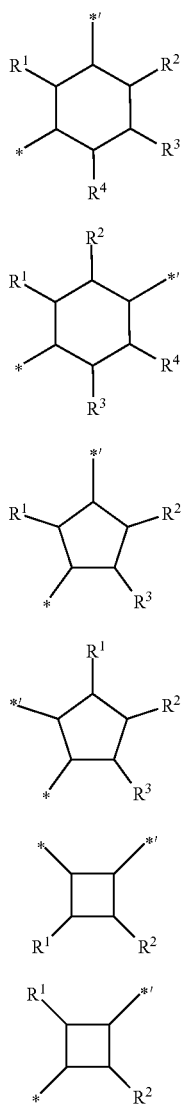

(5)

(6)

(7)

(8)

(9)

(10)

in which
n=0 to 4;
o=0 to 4;
* and *' represent binding sites for the bridge Z to $Y^1$ and $Y^2$ of formula (1) or $Y^3$ and $Y^4$ of formula (2); and
$R^1$, $R^2$, $R^3$ and $R^4$, independently of one another, are selected from the group comprising H, C1-C15 alkyl and C3-C10 cycloalkyl.

The stereochemistry of the two substituents at the asymmetric carbon atoms of formulae (1) or (2) marked with * may in principle be independent of each other. Preferably, however, the two substituents at the asymmetric carbon atoms of formulae (1) or (2) marked with * are in the trans position with respect to each other.

The bridges in formulae (4) to (10) have a ring structure containing 4, 5 or 6 carbon atoms as a basic structure, The stereochemistry of the individual carbon atoms which form the ring structure is only of secondary significance in the present case, and can therefore be any stereochemistry. This is also the case when the carbon atoms of the bridge in accordance with formula (3) are asymmetric. If, for example, n+o=0 in formula (3), then this means that Z represents a methylene group with a $R^2$ and an H substituent and may be either (R) or (S) stereoisomers.

In a preferred embodiment of the invention, the Z comprised in the iron(III) complex with formula (1) or (2) is selected from formulae (3) to (6):

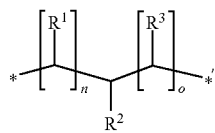

(3)

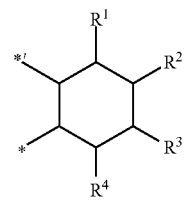

(4)

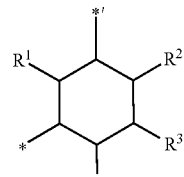

(5)

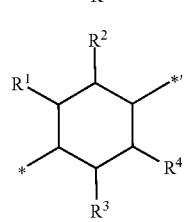

(6)

in which n, o, $R^1$, $R^2$, $R^3$ and $R^4$ are as defined above.

At the binding sites for the bridges Z marked with * and *' in formulae (4) to (10) given above, the substituents $Y^1$ and $Y^2$ of formula (1) or $Y^3$ and $Y^4$ of formula (2) may in principle be cis or trans with respect to each other. Preferably, however, the groups $Y^1$ and $Y^2$ of formula (1) or $Y^3$ and $Y^4$ of formula (2) are in the trans position with respect to each other at the binding sites marked with and As an example, the group in formula (4) may be a 1,2-trans-cyclohexylene group.

Particularly preferably, the * and *' of formulae (4) to (10) are therefore in the trans position with respect to each other. In preferred embodiments of the iron(III) complexes with formula (1) or (2), Z comprises a group selected from: N,N'-1,2-trans-cyclohexylene, N,N'-1,3-trans-cyclohexylene, N,N'-1,4-trans-cyclohexylene, N,N'-1,3-trans-cyclopentylene, N,N'-1,2-trans-cyclobutylene, N,N'-1,3-trans-cyclobutylene and N,N'-1,2-trans-cyclopentylene.

In accordance with a further embodiment in which the iron(III) complex has formula (1), m=2.

More preferably, the iron(III) complex corresponds to formula (1) and $Y^1$ and $Y^2$ represent NH.

Even more preferably, the iron(III) complex corresponds to formula (2) and $Y^3$ represents NH and $Y^4$ represents OH, $NH_2$ or NHR.

Particularly preferred exemplary embodiments of the iron (III) complexes with formula (1) or formula (2) include compounds in which:

Z has formula (4) to (6) in which $R^1=R^2=R^3=R^4=H$, or
Z has formula (5) in which $R^1=R^2=R^3=H$ and $R^4=CH_3$, or
Z has formula (5) in which $R^1=R^3=R^4=H$ and $R^2=CH_3$, or
Z has formula (8) in which $R^1=R^2=H$ and $R^3=CH_3$, or
Z has formula (8) in which $R^2=R^3=H$ and $R^1=CH_3$.

The iron(III) complexes with formulae (1) and (2) now provided have a polydentate ligand derived from cyclohexanediamine tetraacetic acid (CDTA), in particular trans-cyclohexanediamine tetraacetic acid (tCDTA), and are suitable, for example, for use in in vivo diagnostic procedures, in particular as a contrast agent for magnetic resonance imaging (MRI). Compared with Fe-tCDTA, the iron(III) complexes exhibit improved heat and acid resistance, inter alia. In this regard, in preliminary tests, upon heat sterilization in autoclaves (121° C., 15 min; 1 bar; 0.43 mol/L), Fe-tCDTA precipitates out, while the iron(III) complexes remain in solution under the same conditions.

Iron(III) complexes with formula (1) may have higher relaxivities than Fe-tCDTA, for example and—compared with Fe-tCDTA (complex with a single negative charge)— have a neutral overall charge. Thus, for a neutral pH, if required, low concentrations of counter-ions are necessary. Therefore, per iron atom, the osmolality of the iron(III) complexes with formula (1) is greatly reduced. This is advantageous for acute toxicity, so that in addition, higher doses of the iron(III) complexes with formula (1) can be tolerated when used in in vivo diagnostic procedures. Although the lower relaxivity of iron complexes compared with gadolinium complexes has to be compensated for by higher doses, a lower osmolality constitutes a substantial advantage of iron(III) complexes with formula (1) compared with ionic iron complexes such as Fe-DTPA or Fe-tCDTA. In a preferred embodiment, in the iron(III) complex with formula (1), m=2. Thus, the iron(III) complex is a dimer produced from two bridged tCDTA units.

Iron(III) complexes with formula (1-1) and (1-2) are particularly preferred:

The relaxivity of special iron(III) complexes with formula (2) exhibits a surprisingly strong dependency on pH. The strong pH dependency lies in a pH range of 5 to 8, which is particularly attractive as regards medical imaging. As an example, tumours usually have a slightly acidic pH in said range. It is assumed that the pH dependency is due to protonation/deprotonation of the terminal $Y^4$ groups at the bridge Z.

The pH dependency is particularly pronounced in the iron(III) complex with formula (2-1):

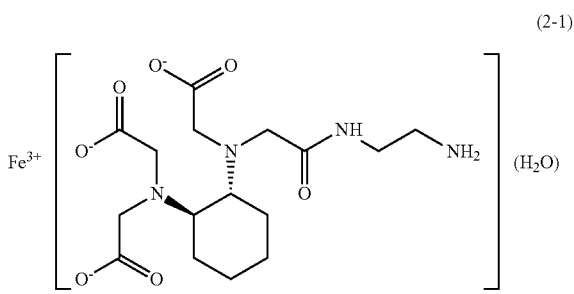

(2-1)

Here, at low pHs, the terminal amino group is protonated and therefore is not available to the central iron(III) ion for coordination, so that instead, coordination occurs with water as the ligand. In contrast, at a higher pH, the free electron pair on the nitrogen contributes to the coordination of the central ion, so that water is displaced from the coordination site. The presence of a water ligand in the complex results in a substantial increase in the T1- and T2-relaxivity, which in turn results in an improved contrast effect. Tumours and inflammations usually have a relatively low extracellular pH, which should lead to an increase in contrast.

This pH dependency can be modelled for the iron(III) complex (2-1) as follows:

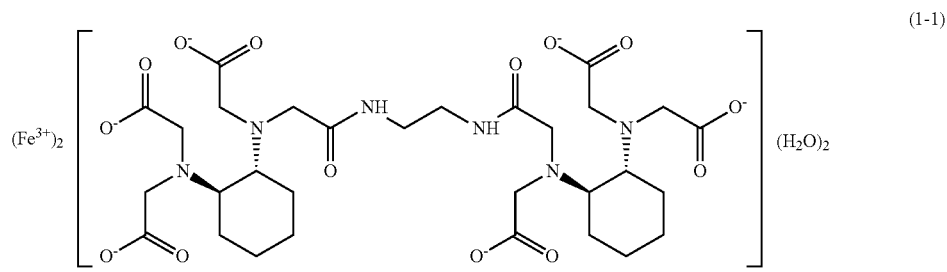

(1-1)

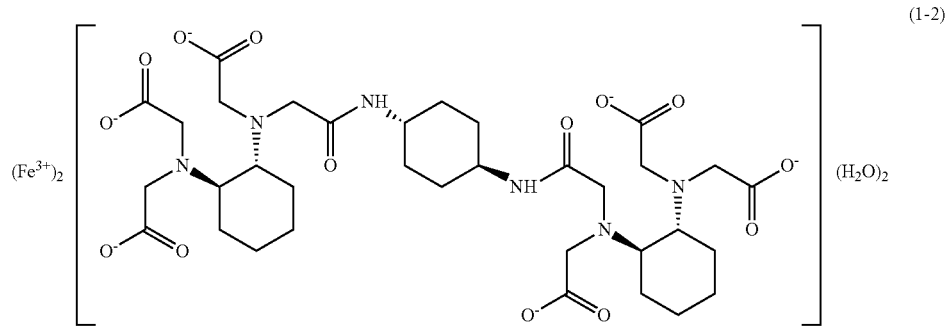

(1-2)

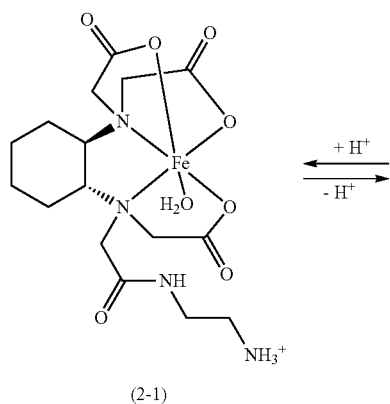

(2-1)

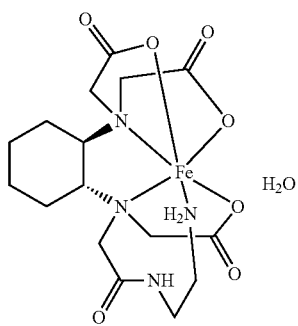

The effect can also be exploited for Chemical Exchange Saturation Transfer (CEST) or Para-CEST imaging, for example, in which the protons of the coordinated water are imaged by means of CEST. In order to arrive at pHs which are independent of concentration, the amide proton may additionally be imaged by CEST, for example, and be calculated along with the water protons.

Preferred embodiments are iron complexes with formulae (2-1) and (2-2).

A particularly preferred embodiment is the iron complex with formula (2-2):

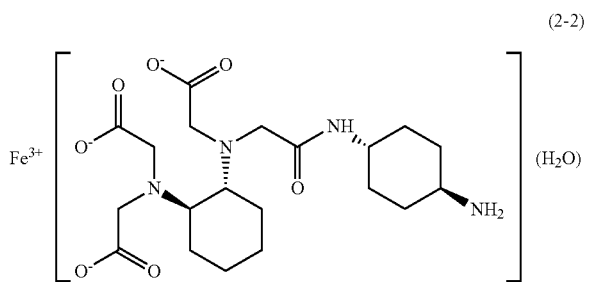

(2-2)

The low-flexibility terminal amino group cannot form a complex with the central ion, whereupon a pH-dependent deactivation is prevented. The terminal $Y^4$ group of the iron(III) complex with formula (2), for example the amino group in iron(III) complexes with formulae (2-1) and (2-2), can furthermore be used for chemical coupling reactions in order, for example, to label biomolecules or other substances and therefore to be made detectable by the MRI. In this regard, an amino group can be transformed into a functional group which is suitable for the envisaged coupling reaction, for example an isocyanate group.

In the context of the present invention, the term "C1-C15 alkyl" should be understood to mean a linear or branched alkyl residue with general formula $CH_nH_{2n+1}$, wherein n=1 to 15. As an example, "C1-C5 alkyl" includes methyl, ethyl, n-propyl, 2-propyl, n-butyl, 2-butyl, 2-methylpropyl, 2-methyl-2-propyl, n-pentyl, 2-pentyl, 2-methylbutyl, 3-methylbutyl, 2-methyl-2-butyl, 3-methyl-2-butyl, 2,2-dimethylpropyl and 3-pentyl. Examples of alkyl residues with n≥6 include n-hexyl, n-heptyl, n-octyl, n-nonyl, n-decyl, 2-hexyl, 2-heptyl, 2-octyl, 2-nonyl, 2-decyl, 2-undecyl, 3-hexyl, 3-heptyl, 3-octyl, 3-nonyl, 3-decyl, 3-undecyl, 3-dodecyl, 2-methylpentyl, 2-methylhexyl, 2-methylheptyl, 2-methyloctyl, 2-methylnonyl, 2-methyldecanyl, 2-ethylbutyl, 2-ethylpentyl, 2-ethylhexyl, 2-ethylheptyl, 2-ethyloctyl, 2-ethylnonyl, 2-ethyldecanyl, 2-methyl-2-pentyl, 2-methyl-2-hexyl, 2-methyl-2-heptyl, 2-methyl-2-octyl, 2-methyl-2-nonyl, 2-methyl-2-decyl, 2-methyl-2-undecyl, 3-methyl-2-pentyl, 3-methyl-2-hexyl, 3-methyl-2-heptyl, 3-methyl-2-octyl, 3-methyl-2-nonyl, 3-methyl-2-decyl, 3-methyl-2-undecyl, 3-ethyl-2-pentyl, 3-ethyl-2-hexyl, 3-ethyl-2-heptyl, 3-ethyl-2-octyl, 3-ethyl-2-nonyl, 3-ethyl-2-decyl, 3-ethyl-2-undecyl, 2-methyl-3-pentyl, 4-methyl-3-hexyl, 4-methyl-3-heptyl, 4-methyl-3-octyl, 4-methyl-3-nonyl, 4-methyl-3-decyl, 4-methyl-3-undecyl and 4-methyl-3-dodecyl.

In the context of the present invention, furthermore, the term "C3-C10 cycloalkyl" should be understood to mean a monocyclic or bicyclic cycloalkyl residue containing 3 to 15 carbon atoms. Examples include cyclopropyl, cyclobutyl, cyclopentyl, cyclohexyl and cycloheptyl. For their part, the cycloalkyl residues may have one or more substitutions with C1-C5 alkyl residues as defined above. Examples of substituted cycloalkyl residues of this type include 1-methyl-1-cyclopropyl, 1-methyl-1-cyclobutyl, 1-methyl-1-cyclopentyl, 1-methyl-1-cyclohexyl, 1-methyl-1-cycloheptyl, 2-methyl-1-cyclopropyl, 2-methyl-1-cyclobutyl, 2-methyl-1-cyclopentyl, 2-methyl-1-cyclohexyl, 2-methyl-1-cycloheptyl, 3-methyl-1-cyclobutyl, 3-methyl-1-cyclopentyl, 3-methyl-1-cyclohexyl, 3-methyl-1-cycloheptyl, 4-methyl-1-cyclohexyl, 4-methyl-1-cycloheptyl, 1,2-dimethyl-1-cyclopropyl, 2,2-dimethyl-1-cyclopropyl, 2,3-dimethyl-1-cyclopropyl, 1,2-dimethyl-1-cyclobutyl, 1,3-dimethyl-1-cyclobutyl, 2,2-dimethyl-1-cyclobutyl, 2,3-dimethyl-1-cyclobutyl, 2,4-dimethyl-1-cyclobutyl, 3,3-dimethyl-1-cyclobutyl, 1,2-dimethyl-1-cyclopentyl, 1,3-dimethyl-1-cyclopentyl, 2,2-dimethyl-1-cyclopentyl, 2,3-dimethyl-1-cyclopentyl, 2,4-dimethyl-1-cyclopentyl, 2,5-dimethyl-1-cyclopentyl, 3,3-dimethyl-1-cyclopentyl, 3,4-dimethyl-1-cyclopentyl, 1,2-dimethyl-1-cyclohexyl, 1,3-dimethyl-1-cyclohexyl, 1,4-dimethyl-1-cyclohexyl, 1,5-dimethyl-1-cyclohexyl, 1,6-dimethyl-1-cyclohexyl, 2,2-dimethyl-1-cyclohexyl, 2,3-dimethyl-1-cyclohexyl, 2,4-dimethyl-1-cyclohexyl, 2,5-dimethyl-1-cyclohexyl, 2,6-dimethyl-1-cyclohexyl, 3,3-dimethyl-1-cyclohexyl, 3,4-dimethyl-1-cyclohexyl, 3,5-dimethyl-1-cyclohexyl, 3,6-dimethyl-1-cyclohexyl, 4,4-dimethyl-1-cyclohexyl, 1,2,2-trimethyl-1-cyclopropyl, 1,2,3-trimethyl-1-cyclopropyl, 1,2,2-trimethyl-1-cyclobutyl, 1,3,3-trimethyl-1-cyclobutyl, 1,2,3-trimethyl-1-cyclobutyl, 2,2,3-trimethyl-1-cyclobutyl, 2,2,4-trimethyl-1-cyclobutyl, 1,2,2-trimethyl-1-cyclopentyl, 1,2,3-trimethyl-1-cyclopentyl, 1,2,4-trimethyl-1-cyclopentyl, 1,2,5-trimethyl-1-cyclopentyl, 1,3,3-trimethyl-1-cyclopentyl, 1,3,4-trimethyl-1-cyclopentyl, 1,3,5-trimethyl-1-cyclopentyl, 2,2,3-trimethyl-1-cyclopentyl, 2,2,4-trimethyl-1-cyclopentyl, 2,2,5-trimethyl-1-cyclopentyl, 2,3,3-trimethyl-1-cyclopentyl, 2,3,4-trimethyl-1-cyclopentyl, 2,3,5trimethyl-1-cyclopentyl, 2,3,3-trimethyl-1-cyclopentyl, 2,4,4-trimethyl-1-cyclopentyl, 2,4,5-trimethyl-1-cyclopentyl, 2,5,5-trimethyl-1-cyclopentyl, 3,3,4-trimethyl-1-cyclopentyl, 3,3, 5-trimethyl-1-cyclopentyl, 3,4,5-trimethyl-1-cyclopentyl, 3,4,4-trimethyl-1-cyclopentyl, 1,2,2-trimethyl-1-cyclohexyl, 1,2,3-trimethyl-1-cyclohexyl, 1,2,4-trimethyl-1-cyclohexyl, 1,2,5-trimethyl-1-cyclohexyl, 1,2,6-trimethyl-1-cyclohexyl, 1,3,3-trimethyl-1-cyclohexyl, 1,3,4-trimethyl-1-cyclohexyl, 1,3,5-trimethyl-1-cyclohexyl, 1,3,6-trimethyl-1-cyclohexyl, 1,4,4-trimethyl-1-cyclohexyl, 2,2,3-trimethyl-1-cyclohexyl, 2,2,4-trimethyl-1-cyclohexyl, 2,2,5-trimethyl-1-cyclohexyl, 2,2,6-trimethyl-1-cyclohexyl, 2,3,3-trimethyl-1-cyclohexyl, 2,3,4-trimethyl-1-cyclohexyl, 2,3,5-trimethyl-1-cyclohexyl, 2,3,6-trimethyl-1-cyclohexyl, 2,4,4-trimethyl-1-cyclohexyl, 2,4,5-trimethyl-1-cyclohexyl, 2,4,6-trimethyl-1-cyclohexyl, 2,5,5-trimethyl-1-cyclohexyl, 2,5,6-trimethyl-1-cyclohexyl, 2,6,6-trimethyl-1-cyclohexyl, 3,3,4-trimethyl-1-cyclohexyl, 3,3,5-trimethyl-1-cyclohexyl, 3,3,6-trimethyl-1-cyclohexyl, 3,4,4-trimethyl-1-cyclohexyl, 3,4,5-trimethyl-1-cyclohexyl, 3,4,6-trimethyl-1-cyclohexyl, 3,5,6-trimethyl-1-cyclohexyl, 1,2,3,3-tetramethyl-1-cyclopropyl, 2,2,3,3-tetramethyl-1-cyclopropyl, 1,2,2,3-tetramethyl-1-cyclopropyl, 1,2,2,3-tetramethyl-1-cyclobutyl, 1,2,3,3-tetramethyl-1-cyclobutyl, 2,2,3,3-tetramethyl-1-cyclobutyl, 2,3,3,4-tetramethyl-1-cyclobutyl, 1,2,2,3-tetramethyl-1-cyclopentyl, 1,2,2,4-tetramethyl-1-cyclopentyl, 1,2,2,5-tetramethyl-1-cyclopentyl, 1,2,3,3-tetramethyl-1-cyclopentyl, 1,2,3,4-tetramethyl-1-cyclopentyl, 1,2,3,5-tetramethyl-1-cyclopentyl, 1,2,5,5-tetramethyl-1-cyclopentyl, 2,2,3,3-tetramethyl-1-cyclopentyl, 2,2,3,3-tetramethyl-1-cyclohexyl, 2,2,4,4-tetramethyl-1-cyclohexyl, 2,2,5,5-tetramethyl-1-cyclohexyl, 3,3,4,4-tetramethyl-1-cyclohexyl, 3,3.5.5-tetramethyl-1-cyclohexyl, 1-ethyl-1-cyclopropyl, 1-ethyl-1-cyclobutyl, 1-ethyl-1-cyclopentyl, 1-ethyl-1-cyclohexyl, 1-ethyl-1-cycloheptyl, 2-ethyl-1-cyclopropyl, 2-ethyl-1-cyclobutyl, 2-ethyl-1-cyclopentyl, 2-ethyl-1-cyclohexyl, 2-ethyl-1-cycloheptyl, 3-ethyl-1-cyclobutyl, 3-ethyl-1-cyclopentyl, 3-ethyl-1-cyclohexyl, 3-ethyl-1-cycloheptyl, 4-ethyl-1-cyclohexyl and 4-ethyl-1-cycloheptyl.

The iron(III) complexes with formulae (1) or (2) may be used in in-vivo-diagnostic procedures, in particular as contrast agents for magnetic resonance imaging. In particular, a contrast agent for magnetic resonance imaging may contain said iron(III) complex.

The following ligands with formulae (L1) or (L2) are required for the production of the iron(III) complexes:

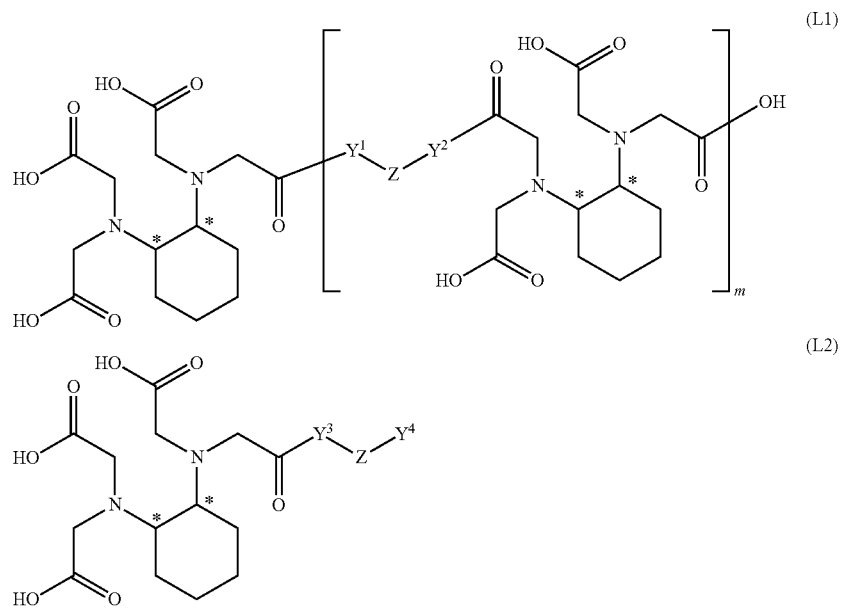

in which m=1 to 5;

$Y^1$ and $Y^2$, independently of one another, are selected from the group comprising O, NH and NR, wherein R represents C1-C15 alkyl or C3-C10 cycloalkyl;

$Y^3$ is selected from the group comprising O, NH and NR, wherein R represents C1-C15 alkyl or C3-C10 cycloalkyl;

$Y^4$ is selected from the group comprising OH, OR, $NH_2$, NHR and $NR^5R^6$, wherein R, $R^5$ and $R^6$ represent C1-C15 alkyl or C3-C10 cycloalkyl and $R^5$ and $R^6$ are selected independently of each other;

Z represents a bridge in accordance with one of formulae (3) to (10):

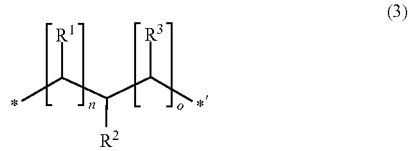

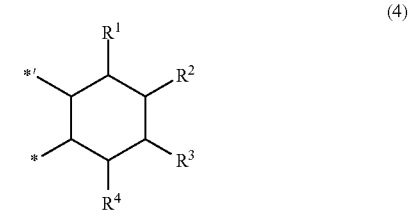

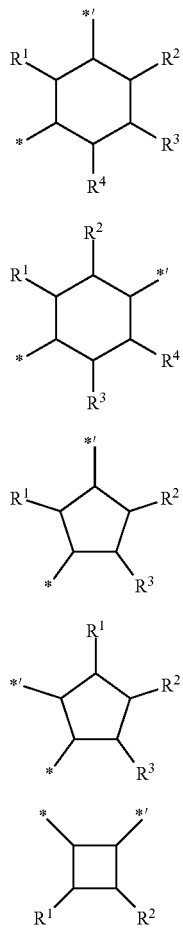

(5)
(6)
(7)
(8)
(9)

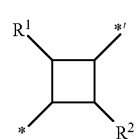

(10)

in which n=0 to 4;

o=0 to 4;

* and *' represent binding sites for the bridge Z to $Y^1$ and $Y^2$ of formula (1) or $Y^3$ and $Y^4$ of formula (2); and $R^1$, $R^2$, $R^3$ and $R^4$, independently of one another, are selected from the group comprising H, C1-C15 alkyl and C3-C10 cycloalkyl;

with the exception of ligands with formula (L2) in which Z is equal to *—CH$_2$CH$_2$—*'.

Ligands in which the two substituents at the asymmetric carbon atoms marked with * in formulae (L1) or (L2) are in the trans position are preferred.

When Z corresponds to formulae (4) to (10), the groups $Y^1$ and $Y^2$ of formula (L1) or $Y^3$ and $Y^4$ of formula (L2) are preferably in the trans position at the binding sites marked with * and *'.

More preferably, the ligand corresponds to formula (L1) and $Y^1$ and $Y^2$ respectively represent NH.

When the ligand corresponds to formula (L2), then preferably, $Y^3$ represents NH and $Y^4$ represents OH, NH$_2$ or NHR.

Ligands with formulae (L1-1), (L1-2) and (L2-2) are particularly preferred:

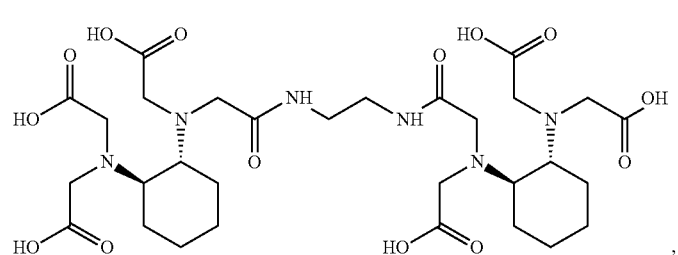

(L1-1)

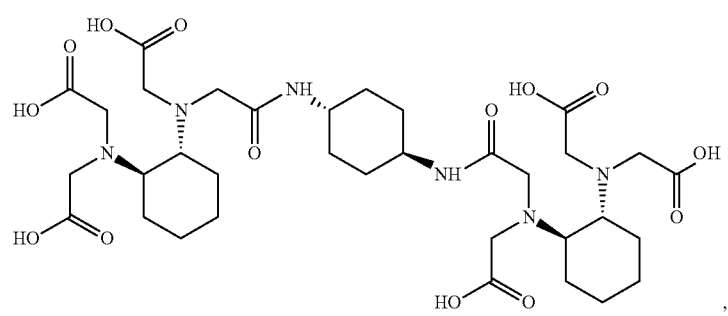

(L1-2)

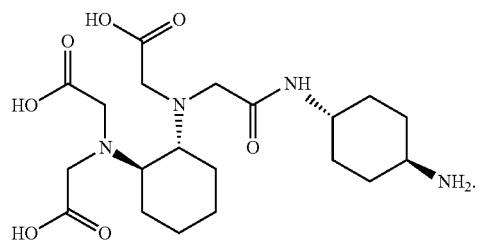

(L2-2)

The description above pertaining to the iron(III) complexes should be referred to in respect of further preferred embodiments of the ligands with formulae (L1) and (L2).

The production of all iron(III) complexes with formula (2) may be carried out in accordance with the following general reaction scheme:

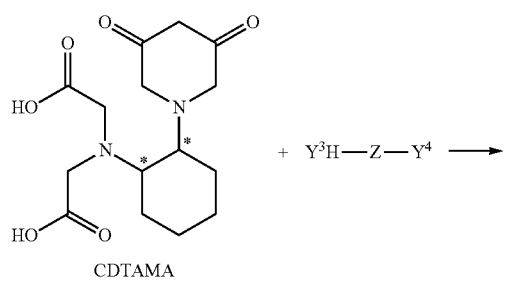

CDTAMA

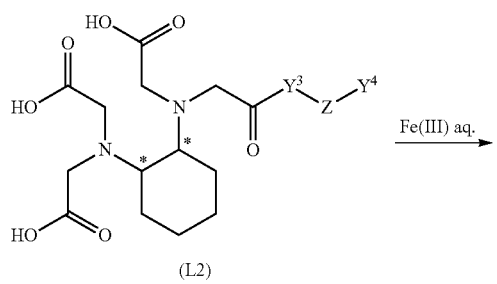

(L2)

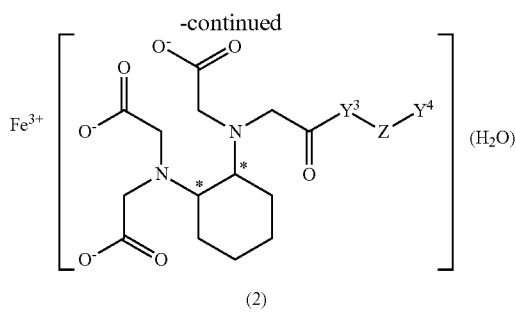

(2)

$Y^3$, $Y^4$ and Z are as defined as above for the iron(III) complexes with formula (2) or ligands with formula (L-2). The synthesis starts from the anhydride CDTAMA, preferably the anhydride tCDTAMA; the approach is known from the literature, see Gestin J F, Faivre-Chauvet A, Mease R C, et al., Nucl Med Biol, 1993; 20(6), 755-762. Furthermore, this reference to the lithotripsy also describes the reaction of the anhydride tCDTAMA with, for example, ethane-1,2-diamine (synonym: ethylene diamine) to form N-[methyl (2-aminoethyl)carbamide]-trans-1,2, diaminacyclohexane-N,N',N'-triacetic acid, wherein a large excess of the diamine in solution in DMSO (dimethylsulphoxide) is added to the anhydride. An aqueous excess of a Fe(III) salt in solution is added to the ligand (L2) and the precipitated complex (2) is separated out. Z is a group with formulae (3) to (10), as already described above.

The production of the iron(III) complex with formula (1) may be carried out in an analogous manner in accordance with the following general reaction scheme:

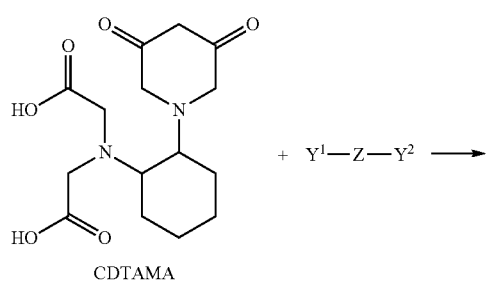

CDTAMA

-continued

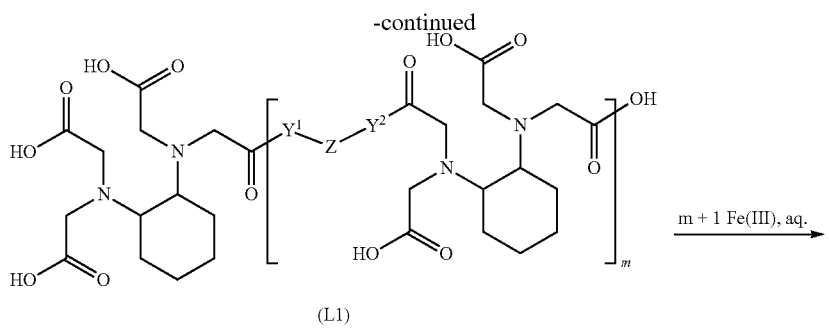

(L1)

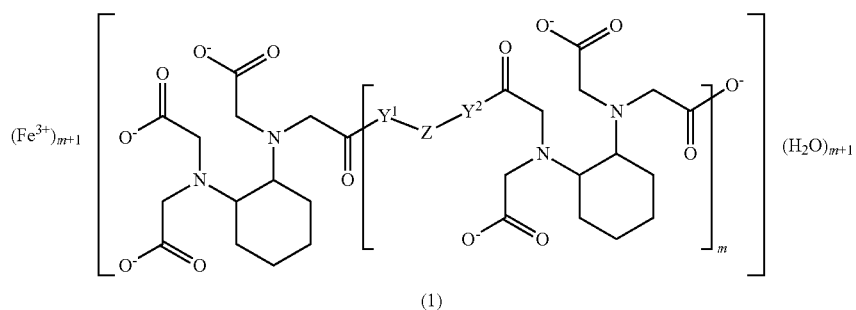

(1)

The synthesis again commences with the known anhydride CDTAMA, in particular tCDTAMA. Here, however, the anhydride is placed in solution and the coupling agent, for example a diamine, is added dropwise with vigorous stirring. Under these conditions, the diamine, for example, acts as a coupling agent for two anhydrides. An aqueous excess of a Fe(III) salt in solution is added to the ligand (L1) and the precipitated complex (1) is separated out. Z is a group with formulae (3) to (10) as described above.

In accordance with an alternative production process for the iron(III) complexes with formulae (1) or (2), iron loading of the ligands is carried out by means of iron(III) hydroxide, as described in the patent application PCT/EP2019/064750. In this process, initially, iron(III) hydroxide is produced using iron(III) chloride and sodium hydroxide and is then washed with water. The iron(III) hydroxide is then used directly in order to load the ligands with iron(III).

Furthermore, in accordance with a further alternative variation, the iron loading may be carried out by means of iron(III) chloride (Boehm-Sturm P. et al, "Low-Molecular-Weight Iron Chelates May Be an Alternative to Gadolinium-based Contrast Agents for T1-weighted Contrast-enhanced MR Imaging", Radiology 2017; 286(2):537-546), but this suffers from the disadvantage of a higher NaCl concentration.

In accordance with yet more variations, iron loading is carried out using iron(III) nitrate.

EXEMPLARY EMBODIMENTS

Synthesis of Iron(III) Complex (2-1)

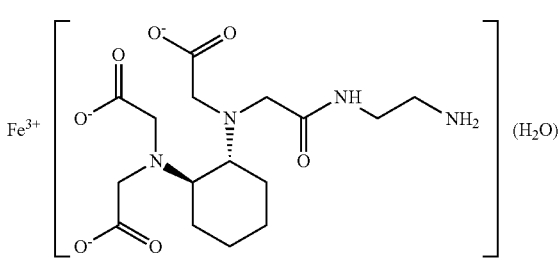

(2-1)

6.53 g (17.9 mmol) of trans-1,2-diaminocyclohexane-N,N,N',N'-tetraacetic acid (CDTA) was added to a solution of 12.87 mL (136.2 mmol) of acetic acid anhydride and 2.75 mL of pyridine. After stirring for 24 hours at room temperature under argon, the reaction mixture was filtered and washed with acetic acid anhydride, followed by an excess of ethyl acetate. The solid was collected and dried under vacuum, whereupon 5.30 g of a white powder (CDTA monoanhydride) was obtained.

CDTA monoanhydride (CDTAMA) (14.4 mmol, 5 g) was added as a solid in small portions, over a time period of 6 hours, to a solution of 19.31 mL of ethylenediamine (289 mmol) and 23.75 mL of DMSO under argon. Following the addition, the reaction mixture was stirred overnight at room temperature. The mixture was then concentrated by means of a rotary evaporator to a thick orange oil which solidified upon standing. The residue was dissolved in methanol and formed a precipitate at room temperature, which was then washed with methanol. 3.98 g of 2,2'-({(1R,2R)-2-[{2-[(2-aminoethyl)amino]-2-oxoethyl}carboxymethyl)amino]cyclohexyly}-azanediyl)diacetic acid (L2-1) was obtained as a white solid.

2 g of iron(III)-nitrate nonahydrate was dissolved in 10 mL of water and filtered. A mixture of 5 mL of ammonium hydroxide solution (28-30% in water) and 5 mL of water was added dropwise to the iron(III) nitrate solution. The insoluble iron(III) hydroxide formed was collected by filtration (Buchner funnel) and washed several times with water.

1.9 g of L2-1 was dissolved in 4 mL of water. The iron(III) hydroxide was added and the volume of the solution was made up to 10 mL with water. The solution was heated for approximately 2 h at 95° C., with stirring. After this, the solution was cooled and filtered (0.2 μm), and then the volume was reduced to 2 mL by heating. The iron complex was precipitated out by adding acetone (approximately 30 mL), centrifuged and dried. The iron(III) complex 2-1 was dissolved in water and the pH was adjusted to 7.3-7.4 with meglumine.

Synthesis of the Ligand (1:1-1)

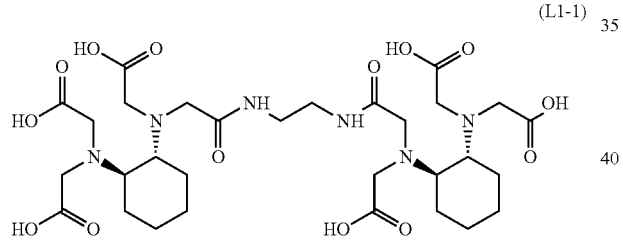

(L1-1)

6.42 g (17.6 mmol) of trans-1,2-diaminocyclohexane-N,N,N',N'-tetraacetic acid (tCDTA) was added to a solution of 12.66 mL (134.0 mmol) of acetic acid anhydride and 2.71 mL of pyridine. After stirring for 24 h at room temperature under argon, the reaction mixture was filtered and washed with acetic acid anhydride, followed by an excess of ethyl acetate. The solid was collected, dried under vacuum and 5.16 g of a white powder was obtained.

N-[methyl-(2-aminoethyl)carbamide]-trans-1,2-diaminocyclohexane-N,N',N'-triacetic acid CDTAMA (12.5 mmol, 4.33 g) was added, as a solid in small portions over a time period of 6 h, to a solution of 0.25 mL of ethylenediamine (3.75 mmol), 36.99 mL of DMSO and 4.04 mL (50 mmol) of pyridine under argon. Following the addition, the reaction mixture was stirred overnight at room temperature. After drying in a rotary evaporator, the residue was washed with copious quantities of ether and ethanol and then purified by column chromatography on Sephadex G-10 gel, The product fractions were analysed using HPLC, collected and then freeze-dried.

Synthesis of Comparative Example
[Fe(III)tCDTA]⁻

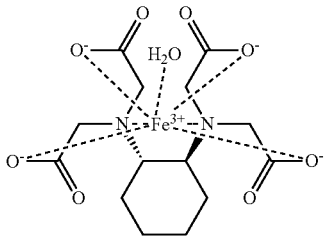

20 g of iron(III) nitrate nonahydrate was dissolved in 100 mL of water and filtered. A mixture of 50 mL of ammonium hydroxide solution (28-30% in water) and 50 mL of water was added dropwise to the iron(III) nitrate solution. The insoluble iron(III) hydroxide which was formed was collected by filtration (Büchner funnel) and washed several times with water.

17.1 g of tCDTA was dissolved in 40 mL of water. The iron(III) hydroxide was added and the volume of the solution was made up to 100 mL with water. The solution was heated for approximately 2 h at 95° C., with stirring. After this, the solution was cooled and filtered (0.2 μm) and then the volume was reduced to 20 mL by heating. The iron complexes were precipitated by adding acetone (approximately 300 mL), then centrifuged and dried. Fe-tCDTA was dissolved in water and the pH was adjusted to 7.3-7.4 with meglumine. (iron concentration 38 nag; mL; 0.68 M)

Synthesis of the Ligand
tCDTA-Mono-Trans-1,4-Diaminocyclohexane
(L2-2)

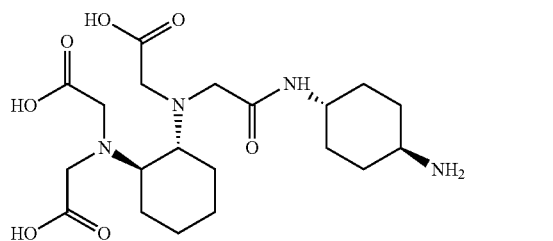

(L2-2)

6.53 g (17.9 mmol) of trans-1,2-diaminocyclohexane-N,N,N',N'-tetraacetic acid (CDTA) was added to a solution of 12.87 mL (136.2 mmol) of acetic acid anhydride and 275 mL of pyridine. After stirring for 24 h at room temperature under argon, the reaction mixture was filtered and washed with acetic acid anhydride, followed by ethyl acetate. The solid was collected, dried under vacuum and 5.3 g of N-[methyl-(2-aminoethyl)carbamide]-trans-1,2-diaminocyclohexane-N,N',N'-triacetic acid (81.2%, CDTAMA) was produced as a white powder.

Over a time period of 6 h and under argon, 2.4 g of N-[methyl-(2-aminoethyl)carbamide]-trans-1,2-diaminocyclohexane-N,N',N'-triacetic acid (6.93 mmol, CDTAMA)

was added in portions to a solution of 3.17 g of trans-1,4-diaminocyclohexane (27.7 mmol) in 18.24 mL of DMSO at 110° C. and dissolved. After addition was complete, the mixture was stirred overnight at room temperature, The mixture was concentrated under reduced pressure, taken up in absolute methanol and crystallised over 2 days at room temperature. The solid was washed with methanol. 1.89 g of L2-2 (79%) was obtained as a white solid.

Synthesis of the Ligand
trans-1,4-diaminocyclohexane-tCDTA Dimer (L1-2)

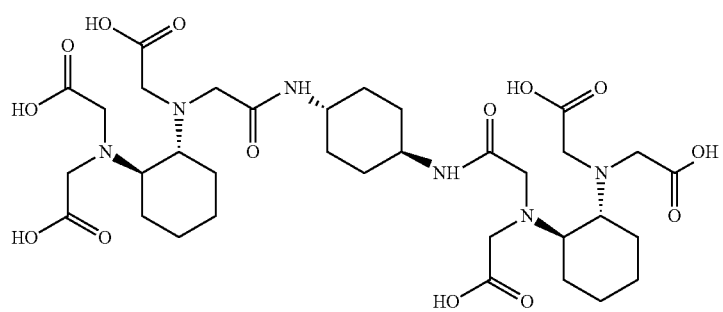

(L1-2)

6.42 g (17.6 mmol) of trans-1,2-diaminocyclohexane-N,N,N',N'-tetraacetic acid (CDTA) was added to a solution of 12.66 mL (134.0 mmol) of acetic acid anhydride and 2.71 mL of pyridine. After stirring for 24 h at room temperature under argon, the reaction mixture was filtered and washed with acetic acid anhydride, followed by ethyl acetate. The solid was dried under vacuum (CDTAMA: white powder).

CDTAMA (17.9 mmol, 5.16 g) was added to a solution of trans-1,4-diaminocyclohexane (7.4 mmol, 0.85 g) in 4.82 mL (59.6 mmol) of pyridine and 58.80 mL of DMSO, and stirring was carried out overnight at room temperature under argon. The mixture was dried in a rotary evaporator. The white residue was dissolved with absolute ethanol, then the supernatant was removed from the residue and dried again by means of the rotary evaporator. The resulting crystals produced a single product peak in HPLC.

Determination of T1- and T2-Relaxity

Figure 1B:
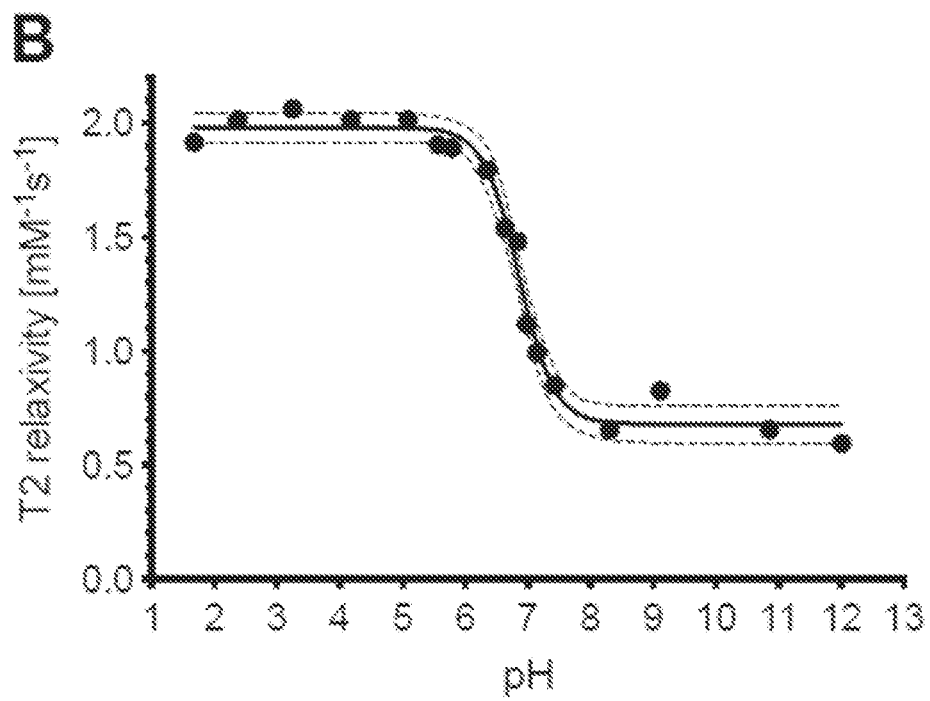

FIG. 1 shows the pH dependency of the T1- and T2-relaxivity of the iron(III) complex with formula (2-1) in water (0.94 T NMR relaxometer, Bruker Minispec mq 40, Karlsruhe, Germany). This shows that both the T1-relaxivity (FIG. 1A) as well as the T2-relaxivity (FIG. 1B) of the iron(III) complex with formula (2-1) follow a sigmoidal rise in the relaxivity with falling pH, with a maximum change between pH 6 and pH 7. At pH<6, a maximum T1-relaxivity of 1.7 l·mmol$^{-1}$·s$^{-1}$ or T2-relaxivity of 1.9 l·mmol$^{-1}$·s$^{-1}$ was reached.

For the subsequent T1-relaxivity measurements which were carried out, ultra-pure water and foetal bovine serum (FBS, pH 7.7) were used as the solvent for the metallic complexes. The relaxivity measurements at different magnetic field strengths were carried out on the following instruments: 0.94 T with a NMR relaxometer (Bruker Minispec mq 40, Germany), 1.5 T with a SIEMENS MAGNETOM Sonata MRI, 3 T with a SIEMENS MAGNETOM Lumina MRI and 7 T with a Bruker Pharmascan Kleintier-MRI. All of the other parameters are listed in Table 1.

TABLE 1

T1-relaxivity (r1) of iron(II) complexes with selected ligands, in l · mmol$^{-1}$ · s$^{-1}$ per metal ion determined at 0.94 T, 1.5 T, 3.0 T and 7.0 T.

| | | T1-relaxivity [l · mmol$^{-1}$ · s$^{-1}$] | | | |
| --- | --- | --- | --- | --- | --- |
| | | Per metal Ion | | | |
| Field strength T (Temperature) | Solvent | Comparative example [Fe(III)tCDTA]$^-$ | (2-2) | (1-2) | Per molecule (1-2) |
| 0.94 | water | 1.56 | 1.92 | 1.99 | 3.98 |
| (37° C.) | FBS | 1.99 | 2.01 | 2.18 | 4.36 |
| 1.5 | water | — | 2.27 | 2.75 | 5.5 |
| (23° C.) | FBS | — | 2.74 | 3.26 | 6.52 |
| 3.0 | water | 2.07 | 2.64 | 2.99 | 5.98 |
| (37° C.) | FBS | 2.35 | 3.06 | 3.39 | 6.78 |
| 7.0 | water | 1.87 | 2.38 | 2.65 | 5.3 |
| (37° C.) | FBS | 2.71 | 2.61 | 3.23 | 6.46 |

The results of the T1-relaxivity measurements show (see Table 1) that the exemplary embodiments in accordance with the invention (2-2) and (1-2), in particular in the clinically particularly relevant field strengths of 1.5 T and 3 T, have significantly higher relaxivities compared with [Fe(III)tCDTA]. For the dimer (1-2), the relaxivity with respect to the total complex molecule, which may be relevant to biodistribution, is particularly high. Having regard to use as a contrast agent for magnetic resonance imaging in in vivo diagnostic processes, this can lead to improved imaging.

Surprisingly, the iron complex (1-2) exhibits liver excretion.

The invention claimed is:

1. An iron(III) complex with formula (1) or (2):

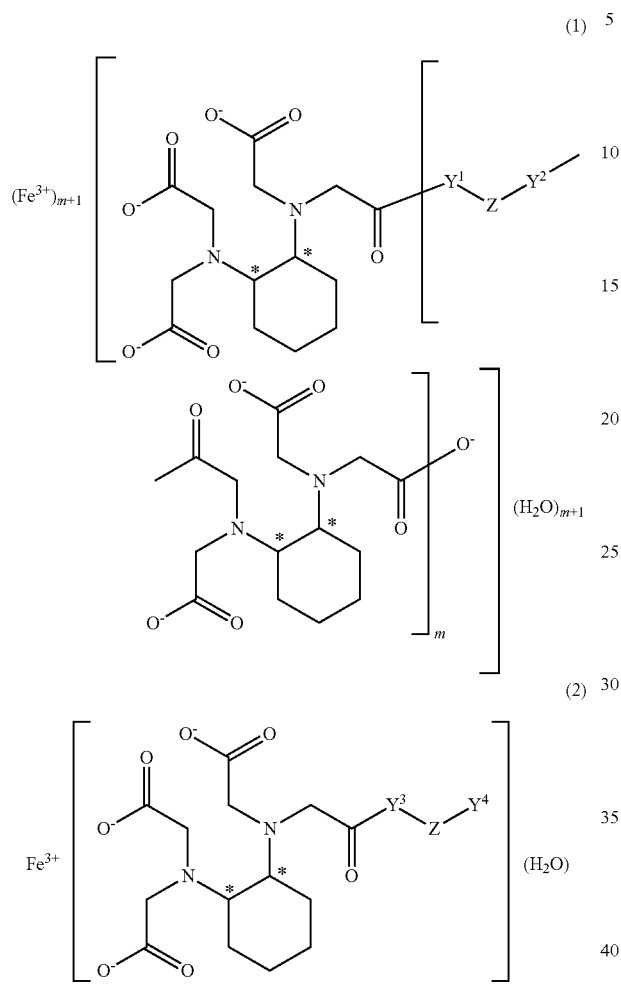

in which m=1 to 5;

$Y^1$ and $Y^2$, independently of one another, are selected from the group comprising O, NH and NR, wherein R represents C1-C15 alkyl or C3-C10 cycloalkyl;

$Y^3$ is selected from the group comprising O, NH and NR, wherein R represents C1-C15 alkyl or C3-C10 cycloalkyl;

$Y^4$ is selected from the group comprising OH, OR, $NH_2$, NHR and $NR^5R^6$·, wherein R, $R^5$ and $R^6$ represent C1-C15 alkyl or C3-C10 cycloalkyl and $R^5$ and $R^6$ are selected independently of each other;

Z represents a bridge in accordance with one of formulae (3) to (10):

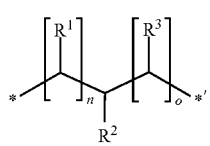

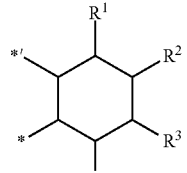

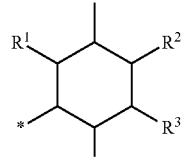

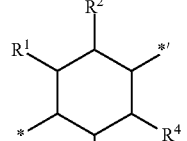

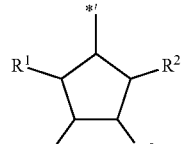

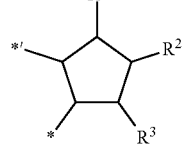

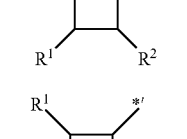

in which n=0 to 4;

o=0 to 4;

\* and \*' represent binding sites for the bridge Z to $Y^1$ and $Y^2$ of formula (1) or $Y^3$ and $Y^4$ of formula (2); and $R^1$, $R^2$, $R^3$ and $R^4$, independently of one another, are selected from the group comprising H, C1-C15 alkyl and C3-C10 cycloalkyl.

2. The iron(III) complex as claimed in claim 1, in which the two substituents at the asymmetric carbon atoms of formula (1) or formula (2) marked with \* are in the trans position.

3. The iron(III) complex as claimed in claim 1, in which Z has formulae (4) to (10) and the groups $Y^1$ and $Y^2$ of formula ($^1$) or $Y^3$ and $Y^4$ of formula (2) at the binding sites marked with \* and \*' are in the trans position with respect to each other.

4. The iron(III) complex as claimed in claim 1, in which the iron(III) complex has formula (1) and m=2.

5. The iron(III) complex as claimed in claim 1, in which the iron(III) complex has formula (1) and $Y^1$ and $Y^2$ represent NH.

6. The iron(III) complex as claimed in claim 1, in which the iron(III) complex has formula (2) and $Y^3$ represents NH and $Y^4$ represents OH, $NH_2$ or NHR.

7. The iron(III) complexes as claimed in claim 1 with formulae (1-1), (1-2), (2-1) or (2-2):

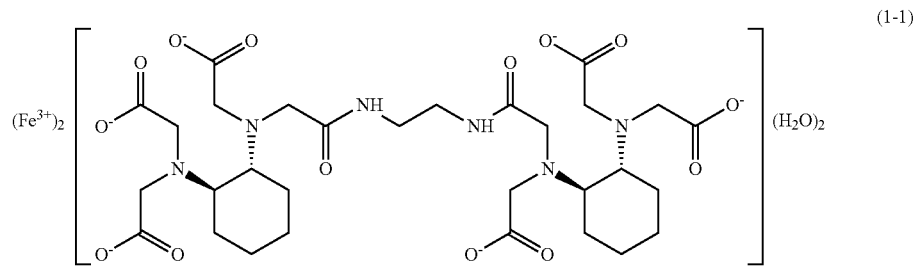

(1-1)

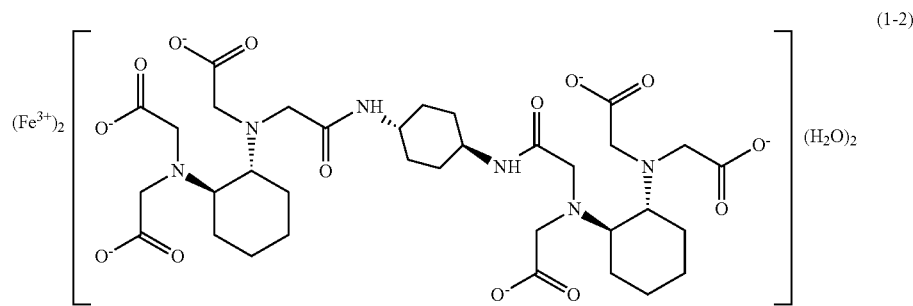

(1-2)

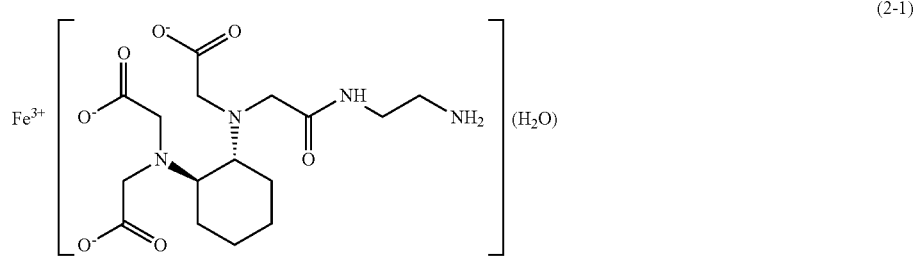

(2-1)

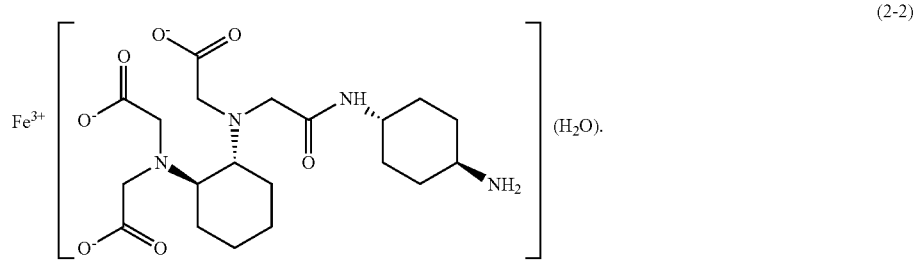

(2-2)

8. The iron(III) complex as claimed in claim 1, wherein the iron(III) complex is a contrast agent for magnetic resonance imaging.

9. A contrast agent for magnetic resonance imaging, the contrast agent comprising the iron(III) complex as claimed in claim 1.

10. A ligand with formula (L1) or (L2):

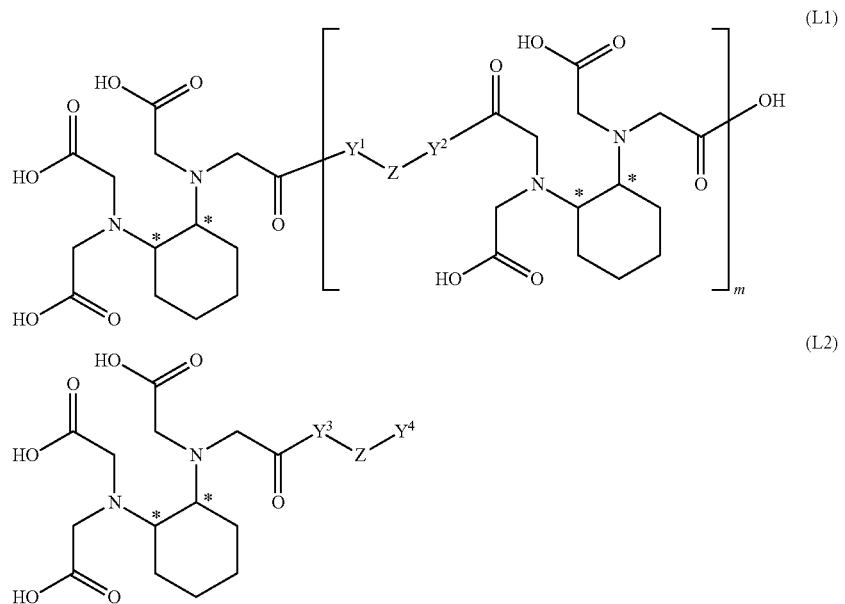

in which m=1 to 5;

$Y^1$ and $Y^2$, independently of one another, are selected from the group comprising O, NH and NR, wherein R represents C1-C15 alkyl or C3-C10 cycloalkyl;

$Y^3$ is selected from the group comprising O, NH and NR, wherein R represents C1-C15 alkyl or C3-C10 cycloalkyl;

$Y^4$ is selected from the group comprising OH, OR, $NH_2$, NHR and $NR^5R^6$, wherein R, $R^5$ and $R^6$ represent C1-C15 alkyl or C3-C10 cycloalkyl and $R^5$ and $R^6$ are selected independently of each other;

Z represents a bridge in accordance with one of formulae (3) to (10):

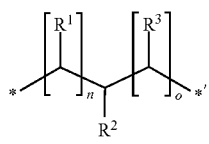 (3)

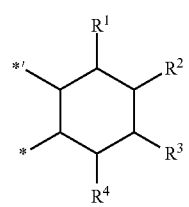 (4)

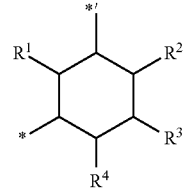 (5)

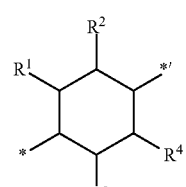 (6)

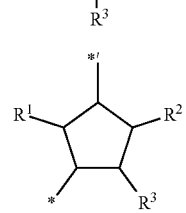 (7)

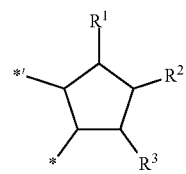 (8)

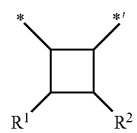 (9)

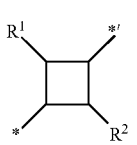 (10)

in which n=0 to 4;

o=0 to 4;

\* and \*' represent binding sites for the bridge Z to $Y^1$ and $Y^2$ of formula (1) or $Y^3$ and $Y^4$ of formula (2); and $R^1$, $R^2$, $R^3$ and $R^4$, independently of one another, are selected from the group comprising H, C1-C15 alkyl and C3-C10 cycloalkyl;

with the exception of ligands with formula (L2) in which Z is equal to \*—CH$_2$CH$_2$—\*', wherein when $Y^3$ is NH and $Y^4$ is NH$_2$, then Z represents a bridge in accordance with one of formulae (4) to (6):

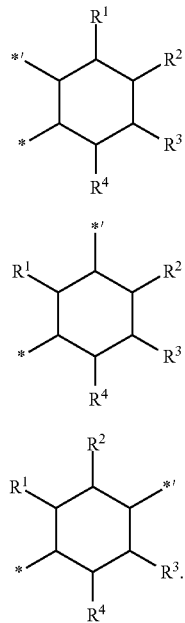

11. The ligand as claimed in claim 10, in which the two substituents at the asymmetric carbon atoms marked with \* in formulae (L1) or (L2) are in the trans position.

12. The ligand as claimed in claim 10, in which Z has formulae (4) to (10) and the groups $Y^1$ and $Y^2$ of formula (L1) or $Y^3$ and $Y^4$ of formula (L2) are in the trans position at the binding sites marked with \* and \*'.

13. The ligand as claimed in claim 10, in which the ligand has formula (L1) and $Y^1$ and $Y^2$ represent NH.

14. The ligand as claimed in claim 10, in which the ligand has formula (L2) and $Y^3$ represents NH and $Y^4$ represents OH, NH$_2$ or NHR.

15. The ligand as claimed in claim 10, selected from:

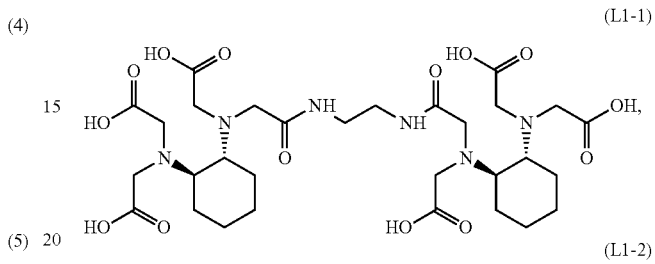

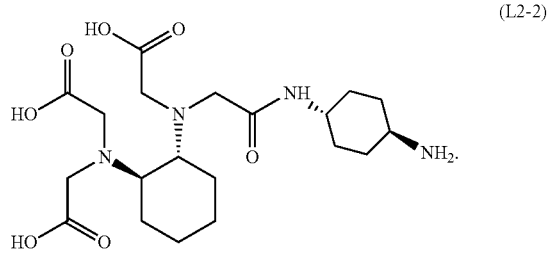

\* \* \* \* \*